US007966800B2

(12) United States Patent
Kemper et al.

(10) Patent No.: US 7,966,800 B2
(45) Date of Patent: Jun. 28, 2011

(54) REDUCED NOISE DRAG CHAIN SYSTEM

(75) Inventors: Uwe Kemper, Kreuztal (DE); Dirk Schöler, Wilnsdorf (DE)

(73) Assignee: Kabelschlepp GmbH, Siegen (DE)

(*) Notice: Subject to any disclaimer, the term of this patent is extended or adjusted under 35 U.S.C. 154(b) by 71 days.

(21) Appl. No.: 12/086,324

(22) PCT Filed: Dec. 22, 2006

(86) PCT No.: PCT/EP2006/012505
§ 371 (c)(1),
(2), (4) Date: Oct. 13, 2009

(87) PCT Pub. No.: WO2007/076988
PCT Pub. Date: Jul. 12, 2007

(65) Prior Publication Data
US 2010/0043385 A1 Feb. 25, 2010

(30) Foreign Application Priority Data
Dec. 23, 2005 (DE) .................. 10 2005 061 760

(51) Int. Cl.
*F16G 13/16* (2006.01)
(52) U.S. Cl. ................. 59/78.1; 59/900; 248/49
(58) Field of Classification Search ............ 59/78.1; 248/49, 51
See application file for complete search history.

(56) References Cited

U.S. PATENT DOCUMENTS

| 5,771,676 A * | 6/1998 | Komiya et al. ............... 59/78.1 |
| 6,161,373 A | 12/2000 | Heidrich et al. |
| 6,481,195 B1 * | 11/2002 | Blase ............................ 59/78.1 |
| 6,864,425 B2 * | 3/2005 | Ikeda et al. .................. 174/74 A |
| 6,992,254 B2 * | 1/2006 | Komiya .................... 174/138 B |
| 7,334,388 B2 | 2/2008 | Eckl et al. |

FOREIGN PATENT DOCUMENTS

| DE | 296 07 492 U1 | 10/1997 |
| DE | 297 11 441 U1 | 2/1999 |
| EP | 0 770 793 A1 | 5/1997 |
| EP | 0 789 167 A1 | 8/1997 |
| EP | 1 267 094 A2 | 12/2002 |
| WO | WO 98/40645 | 9/1998 |
| WO | WO 2005/021996 | 3/2005 |

OTHER PUBLICATIONS

Notification of Transmittal of Translation of the International Preliminary Report received Sep. 18, 2008, 1 p.
PCT/IB/373, International Preliminary Report on Patentability received Sep. 18, 2008, 1 p.
PCT/ISA/237, Translation of Written Opinion of the International Searching Authority received Sep. 18, 2008, 6pp.

* cited by examiner

*Primary Examiner* — David B Jones
(74) *Attorney, Agent, or Firm* — Smith Law Office

(57) ABSTRACT

The invention relates to a drag chain system. The aim of the invention is to reduce the generation of noise in such a system. For this purpose, a side piece has at least one elastic element which is fixed at one end. The side piece comprises at least one stop so that the elastic element of a side piece can interact with a stop of another side piece.

13 Claims, 2 Drawing Sheets

REDUCED NOISE DRAG CHAIN SYSTEM

FIELD AND BACKGROUND OF THE INVENTION

The object of the invention refers to a side part of a corner member on a drag chain device, a member of a drag chain system as well as to a drag chain system.

Drag chain systems for active guidance of conduits, cables or similar with a first end that is arranged stationary and with a second end that is mobile, are known in numerous embodiments. The classical drag chain system, which is also called energy drag chain, consists of a multiple number of chain links that are connected to one another in an articulated manner, and which form a guide channel. Conduits, cables or similar are arranged in this guide channel. WO 98/40645 describes an energy guide device that consists of a one-piece protective element made of plastic. The protective element is injection molded or cast as a single part and among other things it has parts that are connected to one another by flexible bridges.

Another embodiment of a drag chain system is known from EP 0 789 167 A1. This drag chain system too serves for active guiding of conduits, cables or similar with a first end that is arranged stationary and with a second end that is moveable. The drag chain system has a channel, which is formed by segments. The segments are connected to a conveyor belt. During the operation of the drag chain system, this, and thus also the conveyor belt, form a bottom and top of the run as well as a curved region between the top and bottom of the run.

The radius of curvature of the curved region is determined by the angle at which the neighboring members of the drag chain system can be moved with respect to one another. Hereby stop surfaces are provided which lie against one another when the members are angled. In the case of drag chain systems that can be moved fast, this leads to the development of noise when the stop faces impact against one another.

It has already been proposed in DE 296 07 492 U1 that in order to reduce noise emission the stop faces of the corresponding stops have elastically deformable damping elements. The damping elements are arranged in recesses which are made in the stop faces.

In such a design of the drag chain system, a problem arises, namely that the manufacturing expenditure increases since additional damping elements must be introduced into corresponding recesses.

In order to reduce noise emission, it is proposed in DE 297 11 441 U1 that the side parts of a chain link be provided with slanting parts so that upon pivoting the chain links that are joined together run up on these slanted parts, whereby the chain links are provided with deformable areas. The deformable areas have recesses on the sides of which wall regions are formed that contact slanting parts and then these extend into the recesses under elastic deformation.

A problem with such a design of the energy drag unit is that, although braking is applied to the speed, increased application of force is necessary in order to transfer the chain links that are pivoted against one another into their extended position, which involves increased load on the energy drag unit.

SUMMARY OF THE INVENTION

Based on this, the goal of the present invention is to provide a side part of a member of a drag chain system that can be manufactured easily.

The side part according to the invention of a member of a drag chain system has a first region with at least one stop face and a second region with at least a second stop face. The first stop face and the second stop face work together when two side parts are joined with their regions and are swiveled against one another. At least one elastic element is provided whereby the at least one elastic element is secured on one side on the first region. At least one stop is provided in the second region.

Such a side part can be manufactured easily since the elastic element is not an element that is set as is known from DE 296 07 492 U1.

Preferably the element that is secured on one side is arranged outside the stop faces so that a defined swivelability of the two side parts is always achieved.

The reduction of the noise is achieved by the fact that the stop rests on the elastic element before the stop faces of the two side parts lie against one another. The at least one element and the stop are thereby preferably adjusted to one another in such a way that by bending the elastic element, the pivoting movement of the two side parts is reduced. The damping action can be adjusted by appropriate design of the element and of the stop to the requirements of the drag chain system.

Hereby a design of the side part is preferred in which the elastic element has an essentially rectangular cross-section. Such a side part can be manufactured easily, especially when the side part is a plastic injection part, since the mold into which the side part is injected can have a simple construction.

Especially preferred is a design in which the side part has at least one side element that has essentially a constant thickness.

By changing the distance between the side parts, the volume of the guide channel of the drag chain system can be varied. Such a drag chain system can have different loads. Therefore it is proposed that the side part have an element which, when viewed in the longitudinal direction of the element, has a variable thickness. Especially it is proposed that the thickness toward the free element of the element be changed, especially reduced, preferably linearly reduced.

This accompanies the effect that the braking process is increased with increasing swiveling angle.

In addition to the possibility of varying the thickness of the element, it is also possible to change the width of the element according to the requirements. Combinations of different thicknesses and widths of the at least one element are possible and advantageous.

Especially it is proposed that the element be narrowing towards the free end, especially narrowing linearly. Hereby the element can be designed to be for example triangular or trapezoidal in shape.

According to a still further advantageous embodiment of the side element, it is proposed that at least one element be made in one piece with the side element.

The side part preferably is made of plastic. It is proposed that the at least one element be made from a material that is different from the material of the side part. Especially it is proposed that the elastic element consist of a material which has a higher elasticity than the material of the side part.

In order to simplify the manufacture, according to a still further advantageous embodiment of the side part it is proposed that this and the at least one element be produced by the two-component injection method.

According to a further inventive idea, a member of an energy drag system comprising two side parts at a distance from one another and at least one cross piece connecting these is proposed, whereby at least one side part has a first region with at least one first stop face and a second region with at least one second stop face, whereby the first stop face interacts with the second stop face when two members are connected with their side parts. The end regions of at least one side part have at least one element that is secured on one side in the first region and at least one stop in the second region.

According to a still further inventive idea, a drag chain system for guiding at least one conduit or similar between a stationary and a mobile connection is proposed. The drag chain system is formed by side parts that are connected to one another in an articulated manner and at least some of the side parts are connected to one another by cross pieces. At least two side parts are designed with a first region with at least one first stop face and a second region with at least one second stop face, whereby the first stop face of the one first side part works together with the second stop face of the other side part and at least one element secured on one side in the first region of the one side part with at least one stop in the second region of the other side part.

Other details and advantages of the invention will be explained with the aid of the practical examples shown in the drawing without the object of the invention being limited to these concrete practical examples.

DETAILED DESCRIPTION OF THE PREFERRED EMBODIMENTS

Figure 1:
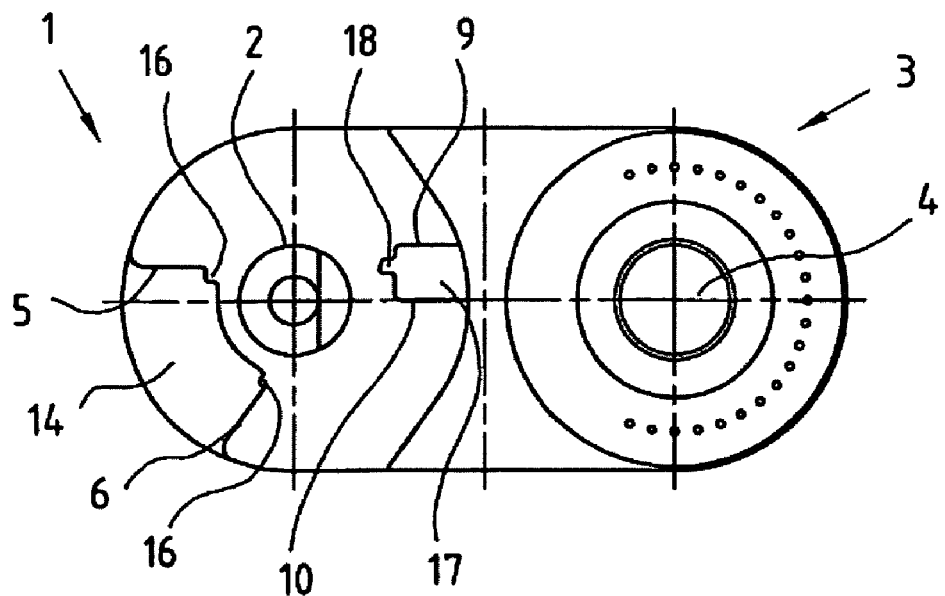
FIG. 1 is a side part in a front view.
Figure 2:
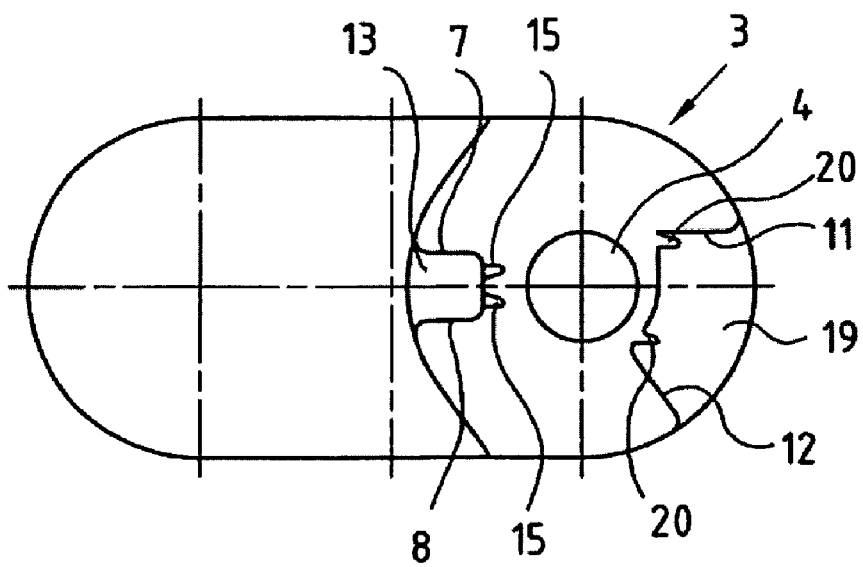
FIG. 2 is a side part according to FIG. 1 in a rear view.
Figure 3:
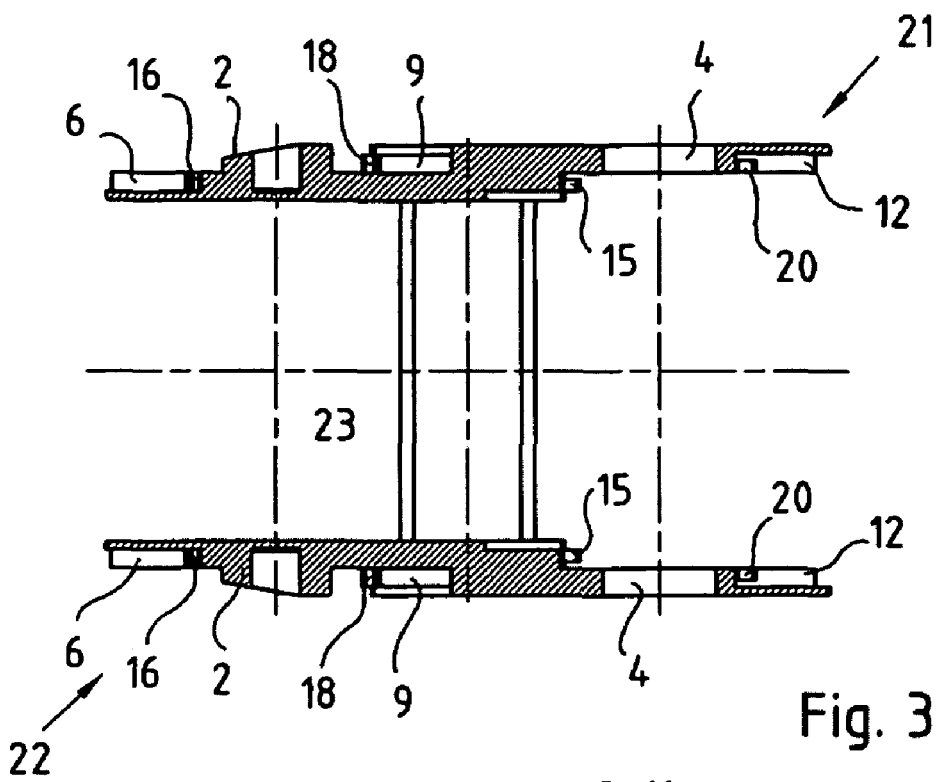
FIG. 3 is a top view and in section a member of a drag chain system.

FIGS. 1 and 2 show a practical example of a side part of a member of a drag chain system. The side part has a first region 1. A joint bolt 2 is formed in region 1.

Opposite the first region 1, a second region 3 is formed that has an articulated receptacle 4. The articulated receptacle 4 and the joint bolt 2 are designed so that the second side parts can be connected to one another. For this purpose the joint bolt 2 engages in the articulated receptacle 4 of a neighboring side part.

In order to limit the swivelability of two side parts that are connected to one another, the first region 1 has stop faces 5, 6 that work together with the stop faces 7, 8 of the second region of the side part. In the practical example shown, the first region 1 has additional stop faces 9, 10, which work together with the stop faces 11, 12 of the second region.

The stop faces 7, 8 are formed on a projection 13. In the practical example shown, they run essentially parallel to the longitudinal edges of the side part.

When two side parts are joined, then the projection 13 engages into a cavity formed in the first region. The cavity is delineated on the side by the stop faces 5, 6. In the practical example shown, two elastic elements 15 are formed on the projection 13. The elastic elements 15 are fixed on one side on the projection 13 so that the elastic elements can be deflected essentially perpendicular to the longitudinal direction of the side part. It can be seen from the practical example shown that the thickness of the elastic element changes toward the free end. The thickness is reduced.

In the region of the cavity 14 of the first region 1, stops 16 are provided that work together with the elastic elements 15. The elastic elements 15 will lie against the stops 16 before the stop faces 5, 8 or 6, 7 come to a stop depending on the direction of swiveling of the two side parts.

It can be seen from FIG. 1 that in the first region 1 the stop faces 9, 10 are designed on an elevation 17. The stop faces 9, 10 extend essentially parallel to the longitudinal edges of the side part. The elevation 17 has a stop 18.

The elevation 17 can be introduced into a correspondingly formed cavity 19 in the second region 3. The cavity 19 is delineated by the stop faces 11, 12. It can be seen from the representation in FIG. 2 that elastic elements 20 are provided in the cavity 19 and next to the stop faces 11, 12, these elastic elements working together with stop 18 when the two sides are connected to one another.

Together with the stops, the elastic elements will cause the noise emission of the drag chain system to be reduced, the swiveling velocity to be reduced due to the elastic bending of the elements before the stop faces of the side parts come into contact with one another.

The elastic elements can also be used for pre-tensioning of a drag chain system so that such a drag chain system can be loaded with larger gauge weight.

The elastic elements can all be the same or different or combinations of different elements and can vary with regard to their geometry and modulus of elasticity. In order to reduce the manufacturing expenditure, however, a uniform material selection for the elastic elements is preferred.

The side part is a plastic injection molded part. The elastic elements are also made of a plastic. Preferably the side part and the elastic elements are manufactured by the two-component injection process.

FIG. 1 shows a practical example of a member of a drag chain system in a top view and in cross section. The member is made of two side parts 21, 22 that are connected to one another with a cross piece 23. The cross piece can be connected to at least one side part 21, 22 in a separable manner. It is also possible for the cross piece to be connected to the side parts in a fixed manner.

The side parts 21, 22 correspond to the side part shown in FIGS. 1 and 2. The same reference numbers are used for the same components.

Figure 4:
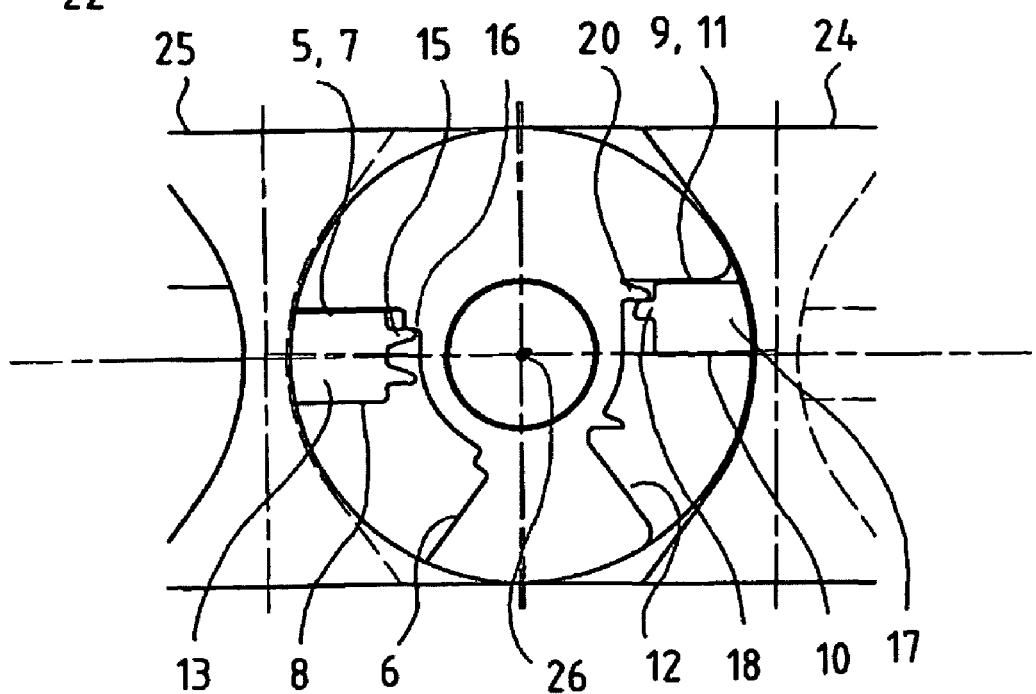
FIG. 4 is a schematic representation in a front view showing the working together of two side parts.

FIG. 4 shows schematically the cooperation of two side parts 24, 25. Hereby the side parts 24, 25 are in an extended position, that is, they are not angled against one another. It can be seen from the representation that in the extended position, the stop faces 9, 11 as well as the stop faces 5, 7 lie against one another. The elastic element 15 lies against stop 16, while the elastic element 20 lies against stop 18 of the elevation 17. The elastic elements 15, 20 have a bending action applied to them in this position.

When the side parts 24, 25 are swiveled around a common axis 26 to the other end position, then the elastic element 15 arrives at the opposite stop 16 before the stop faces 8, 6 are in position. The elastic element 20 is also made to bend by the stop 18 when the side parts 24, 25 are swiveled relative to one another so that the stop faces 10, 12 are to be brought to lie against one another.

The side parts can also have a different design. It is not absolutely necessary for the side part always to have a joint bolt. It is also possible for a separate joint bolt or similar to be used.

With the design according to the invention, a reduction of the noise generation is achieved during operation of a drag chain system.

The invention claimed is:
1. A drag chain system having a plurality of members, each member having a side part comprising:
a first region and a second region;

a first stop face joined to the first region and a second stop face joined to the second region; whereby the first stop face is disposed to cooperate with the second stop face on an adjacent side part; and an elastic element fixed to the first region and disposed to cooperate with a third stop joined to the second region on an adjacent side part.

2. The drag chain system according to claim 1, wherein the elastic element has a substantially rectangular cross section.

3. The side part according to claim 1, wherein the elastic element has a substantially constant thickness.

4. The side part according to claim 1, wherein the elastic element is tapered toward a distal end of the elastic element.

5. The side part according to claim 4, wherein the elastic element thickness decreases toward a distal end of the elastic element.

6. The side part according to claim 1, wherein the elastic element has a substantially constant width.

7. The side part according to claim 1, wherein the elastic element has a plurality of width dimensions.

8. The side part according to claim 1, wherein the elastic element narrows toward a distal end.

9. The side part according to claim 1, wherein the elastic element is formed integrally with the side part.

10. The side part according to claim 1, wherein the elastic element is made of a material that is different from the material of the side part.

11. The side part according to claim 1, wherein the elastic element is produced by a two-component injection method.

12. A drag chain system with a plurality of members, and the members comprise:

two side parts spaced apart from one another and at least one cross piece connecting the two side parts, and one side part has a first region with a first stop face and a second region with a second stop face, whereby the first stop face cooperates with a second stop face on an adjacent member side part; and an elastic element joined to the first region to cooperate with a stop on the second region of an adjacent member side part.

13. A drag chain system for guiding at least one conduit between a stationary and a mobile connection, whereby the drag chain system comprises:

a plurality of members, and the members include a plurality of side parts joined together in an articulated manner; and each side part includes a first region having a first stop face;

a second region having a second stop face for cooperating with a first stop face of an adjacent member side part; and an elastic element joined to the first region to cooperate with a stop on the second region of an adjacent member side part.

* * * * *